United States Patent [19]
Ward et al.

[11] Patent Number: 5,910,346
[45] Date of Patent: Jun. 8, 1999

[54] TUBULAR MATERIALS

[75] Inventors: Ian MacMillan Ward; Gordon Craggs, both of Leeds; Alan Selwood, Harrogate; Ajay Kumar Taraiya, Leeds, all of United Kingdom

[73] Assignee: BTG International Limited, London, United Kingdom

[21] Appl. No.: 08/479,518

[22] Filed: Jun. 7, 1995

Related U.S. Application Data

[63] Continuation of application No. 08/295,005, Aug. 24, 1994, abandoned, which is a continuation of application No. 08/013,164, Feb. 2, 1993, abandoned, which is a continuation of application No. 07/887,392, May 21, 1992, abandoned, which is a continuation of application No. 07/767,365, Sep. 30, 1991, abandoned, which is a continuation of application No. 07/439,888, Nov. 20, 1989, abandoned.

[30] Foreign Application Priority Data

Nov. 30, 1988 [GB] United Kingdom ............... 8827967

[51] Int. Cl.⁶ .................................................. B29D 22/00
[52] U.S. Cl. .................... 428/36.9; 428/36.92; 428/220; 428/910; 138/118; 138/DIG. 7
[58] Field of Search ................... 428/36.9, 36.91, 428/36.92, 910, 480, 220; 138/118, DIG. 7

[56] References Cited

U.S. PATENT DOCUMENTS

| | | | |
|---|---|---|---|
| 2,695,420 | 11/1954 | Longstreth et al. | 425/392 |
| 3,090,991 | 5/1963 | Hathaway | 264/280 |
| 3,201,827 | 8/1965 | Reynolds et al. | 26/83 |
| 3,249,671 | 5/1966 | Perrone et al. | 264/209.5 |
| 3,814,565 | 6/1974 | Cahour et al. | 425/392 |
| 3,956,544 | 5/1976 | Harrington | 428/34.8 |
| 4,027,659 | 6/1977 | Slingluff | 428/36.9 |
| 4,305,983 | 12/1981 | Hoppe et al. | 428/36.9 |
| 4,341,827 | 7/1982 | Austen et al. | 428/36.91 |
| 4,360,552 | 11/1982 | Eustance et al. | 428/36.91 |
| 4,564,558 | 1/1986 | Touhsaent et al. | 428/35.7 |
| 4,697,718 | 10/1987 | Butcher et al. | 220/82 R |
| 4,720,427 | 1/1988 | Clauson et al. | 428/35.7 |
| 4,801,419 | 1/1989 | Ward et al. | 264/288.4 |
| 4,828,770 | 5/1989 | Fabian et al. | 264/40.3 |
| 4,846,645 | 7/1989 | Cole | 425/72.1 |
| 4,894,198 | 1/1990 | Albrecht et al. | 264/521 |
| 5,213,860 | 5/1993 | Laing | 428/36.9 |
| 5,234,733 | 8/1993 | Schloegl et al. | 428/36.91 |

FOREIGN PATENT DOCUMENTS

| | | |
|---|---|---|
| 32159/84 | 3/1985 | Australia . |
| 0 157 601 | 10/1985 | European Pat. Off. . |
| 2 252 202 | 6/1975 | France . |
| 2030 348 | 1/1971 | Germany . |
| 431619 | 7/1935 | United Kingdom . |
| 691125 | 5/1953 | United Kingdom . |
| 868388 | 5/1961 | United Kingdom . |
| 986003 | 3/1965 | United Kingdom . |
| 1003243 | 9/1965 | United Kingdom . |
| 1 113 136 | 5/1968 | United Kingdom . |
| 1 279 187 | 6/1972 | United Kingdom . |

OTHER PUBLICATIONS

"Biaxial Orientation" Encyclopedia of Polymer Science & Technology, vol. 2, W.R.R. Pad (The Dow Chemical Co.) & J. Conrad (Gaylord Associates, Inc.) Interscience Publishers 1965, pp. 339–373.

Whittington's Dictionary of Plastics, First Edition, 1968, p. 105.

*Primary Examiner*—Rena L. Dye
*Attorney, Agent, or Firm*—Nixon & Vanderhye

[57] ABSTRACT

Tubular workpieces of oriented polymers such as polyethylene polyester and PVC are formed by drawing a workpiece over an expanding former in the absence of any force perpendicular to the axis of the workpiece. The processes do not require the use of any liquid lubricant. They enable greater degrees of expansion and hence orientation in the direction perpendicular to the axis to be achieved and result in products of improved appearance and strength.

7 Claims, 1 Drawing Sheet

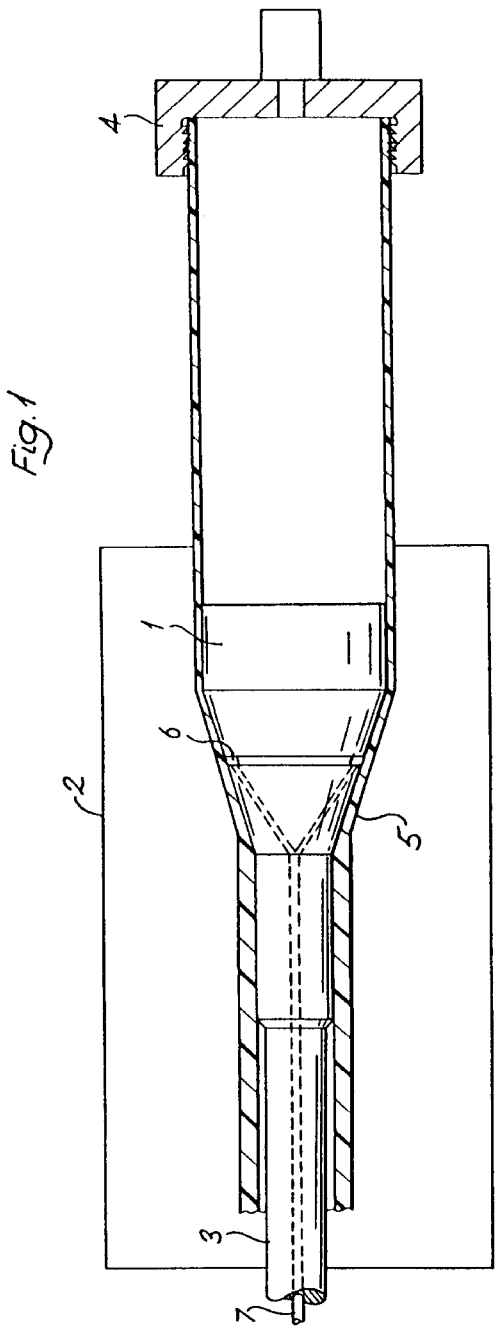

TUBULAR MATERIALS

This is a Rule 60 continuation of application Ser. No. 08/295,005, filed Aug. 24, 1994, now abandoned, which is a Rule 60 continuation of application Ser. No. 08/013,164, filed Feb. 2, 1993, now abandoned, which is a Rule 62 continuation of application Ser. No. 07/887,392, filed May 21, 1992, now abandoned, which is a Rule 62 continuation of application Ser. No. 07/767,365, filed Sep. 30, 1991, now abandoned, which is a Rule 62 continuation application of Ser. No. 07/439,888, filed Nov. 20, 1989, now abandoned.

This invention relates to processes for the production of tubular materials of an orientable thermoplastic polymer by solid phase deformation and to the products of those processes.

BACKGROUND OF THE INVENTION

Previous attempts to introduce biaxial orientation into tubular materials formed from orientable thermoplastic polymeric materials by drawing them over an expanding former have involved only a limited degree of expansion in the hoop direction i.e. in the direction perpendicular to the axis of the tube. British Patent 1456222 describes a process and apparatus used to draw a tube of thermoplastic polymer over an expanding former in order to calibrate the internal dimensions of the tube. The processes described require the application of a liquid lubricant to the inner surface of the workpiece prior to its passage over the former. In our British Patent 2156733 we have described processes in which the tubular material is drawn simultaneously through a die and over an expanding former.

SUMMARY OF THE INVENTION

We have now discovered that uniform biaxially oriented products can be produced by processes which comprise drawing the tubular material over an expanding former without the need to apply a liquid lubricant. Such procedures are advantageous in that the products may have a greater degree of orientation in the hoop direction and correspondingly uniformly greater strength in that direction than has previously been attainable. Furthermore insofar as they involve only drawing the tubular material over a former they offer advantages in simplicity of operation and in the improved appearance of the product.

Accordingly from one aspect our invention provides a process for the production of a biaxially oriented tubular material which comprises drawing a hollow workpiece comprising an orientable thermoplastic polymer over an internally positioned expanding former without the application of a liquid lubricant to the interior of the workpiece which is characterised in that the deformation of the workpiece is carried out in the absence of any external force acting in a direction which is perpendicular to the axis of the workpiece.

BRIEF DESCRIPTION OF THE DRAWINGS

The invention will not be described with reference to the accompanying drawings, in which:

FIG. 1 represents a schematic side elevation of the apparatus diametrically sectional along the machine direction.

DETAILED DESCRIPTION OF THE INVENTION

The term "hollow workpiece" as used herein includes tubes and other cross-sections of hollow stock. The term includes both billets and other forms of stock of greater length. Continuous stock, which may be formed as the process is performed, may be utilised. Examples include open-ended elongate workpieces of substantially constant cross-section, desirably with an axis of symmetry; for example, hollow workpieces of circular, elliptical, square, rectangular or triangular cross-section.

The orientable thermoplastic polymers may be a semicrystalline polymer such as polyethylene, polypropylene or polyvinylidene fluoride, an amorphous crystallising polymer such as polymethylmethacrylate or a crystallisable polymer such as polyvinylchloride, polyesters or polycarbonates. Examples of preferred classes of such polymers are unsubstituted or mono- or poly- halo-, for example chloro- or fluoro- substituted vinyl polymers, unsubstituted or hydroxy-substituted polyesters, polyamides, polyetherketones and polyacetals. Specifically, linear homo- or copolymers of ethylene or propylene with at least one comonomer; a vinyl chloride polymer; a vinyl fluoride polymer or a vinylidene fluoride polymer; PHB; PEEK; or a homo- or co-polyoxymethylene may be utilised.

The hollow workpiece is preferably essentially unoriented before deformation. The term "essentially unoriented" as used herein means that the hollow workpiece has incurred no orientation other than that minor amount which might be induced during formation of the workpiece, (including orientation produced in the semi-molten state) for example during billet moulding or melt extrusion, or during any subsequent shaping thereof, for example by machining, prior to its passage over the former. However, workpieces which have been oriented to a considerable degree may be advantageously utilised in the processes of the present invention. For example workpieces which have been produced by extrusion through a die or by deformation in the solid phase through a die may be utilised.

Where it is not possible to use the polymer as received as a hollow workpiece, the workpiece may be formed either in the batch or continuously. In either case care should be taken to ensure that the workpiece cools at an appropriate rate so that the resulting hollow workpiece will be without defects. The techniques for forming such workpieces are well known in the art. For example in the case of a hollow workpiece formed from polyethylene in a batch process as a billet, the following general methods have been found to be suitable. The polymer may be melted in a screw extruder; extruded or injected into a billet mould at a temperature about 30° C. above its melting point and cooled under elevated pressure for 5 hours, or it may be melted in an extruder; extruded or injected into a cold billet mould; transferred to an oven for 4 hours under ambient pressure at a temperature below its melting point but above its crystallisation temperature; and thereafter allowed to cool in the oven after the heating has been switched off. The polymer may also be injection moulded into an air or water cooled billet mould. Progressive immersion in the cooling fluid is preferred, thereby ensuring that solidification of the polymer takes place from the bottom of the mould thereby preventing the formation of internal voids due to shrinkage. A hollow workpiece may be formed in the batch by including a mandrel of appropriate cross-section, usually coaxially, in the mould. Alternatively, stock of circular or other hollow cross-section may be produced continuously using one of several processes known to those skilled in the art.

For any particular polymer a steady state process may be obtained by adjusting the parameters of the process. The actual values will depend on the nature of the polymer and the dimensions of the polymer before and after deformation.

In particular we have discovered that the minimum hoop draw ratio for any particular polymer should be sufficiently high so as to ensure that a uniform product is produced. Preferably the axial draw ratio is also maintained at a level which ensures this. Where a non-uniform product is produced under particular conditions these ratios can and preferably are increased. The actual values required to produce a uniform product of a particular polymer may readily be determined by routine experiment.

The hoop draw ratio is defined as the ratio of the final hoop dimension to the initial hoop dimension and the axial draw ratio is the ratio of the initial bulk cross-sectional area of the hollow workpiece to the final bulk cross-sectional area of the product. The hoop draw ratio is conventionally expressed as the ratio of the maximum dimension of the product to maximum dimension of the workpiece. Because the walls of a tubular workpiece have a finite thickness the hoop draw ratio can be expressed either as the inner hoop draw ratio (i.e. the ratio of the inside diameter of the product to the inside diameter of the workpiece) or the outer hoop draw ratio (i.e. the ratio of the outside diameter of the product to the outside diameter of the workpiece). The inner hoop draw ratio will always be the larger.

For polyolefins and in particular linear homo and copolymeric polyethylenes the preferred inner hoop draw ratio is at least 1.2 and more preferably at least 1.5 and most preferably at least 2.0. The preferred axial draw ratio is at least 2 and preferably greater than 3. The outer hoop draw ratio may be less than 1 but is preferably at least 1 and more preferably at least 1.5 or 2.0. The ratio of the axial draw ratio to the inner hoop draw ratio is preferably at least 1 and less than 4, most preferably less than 2. For polypropylene it may be preferable to utilize large axial draw ratios even up to 7 or 8 and the ratio of the axial draw ratio to the hoop draw ratio is correspondingly increased.

For these polymers the hollow workpiece is desirably heated to a processing temperature within 60° C. of the melting point of the polymer prior to deformation. More particularly for polyethylene polymers having a weight average molecular weight of from 50,000 to 150,000 the temperature is preferably from 70° C. to 100° C. and for polymers having a weight average molecular weight of above 300,000 from 70 to 120° C. For linear homo- and copolymers of polypropylene of weight average molecular weight from 150,000 to 800,000 the hollow workpiece is desirably heated to a temperature from 20° C. to 170° C., preferably 90° C. to 130° C. The processing temperature is only a nominal temperature since the process is not isothermal but should be within the range which the polymer is amenable to deformation.

The processes of the invention find particular application in the production of tubular polyolefin materials wherein the thickness of the walls of the product tube is from to 0.1 to 5.0 mm.

By "bulk cross sectional area" is meant the area of the polymeric material substantially normal to the machine direction. Thus for tubular workpiece having an exterior diameter $D_2$ and an interior diameter $D_1$ the bulk cross sectional area is $$\pi\left(\frac{D_2^2 - D_1^2}{4}\right)$$

A preferred class of polyesters is those which are derivable from the reaction of at least one polyhydric alcohol, suitably a linear polyhydric alcohol, preferably a diol such as a linear $C_2$ to $C_6$ diol, with at least one polybasic acid, suitably a polycarboxylic acid. The alcohol is preferably an alicyclic or aliphatic such alcohol; for example cyclohexanedimethanol or a linear $C_2$ to $C_6$ alkylene diol such as ethylene glycol, 1,3-propylene glycol, or 1,4-butylene glycol, especially ethylene glycol. The acid is preferably an aromatic, alicyclic or aliphatic such acid; for example a mono- or poly carbocyclic aromatic acid such as an aromatic dicarboxylic acid e.g. o-, m- or p-terephthalic acid; 2,6- or 1,5-naphthalene dicarboxylic acid or 1,2 dihydroxybenzoic acid especially terephthalic acid. Examples of suitable polyesters include polyethylene 2,6-naphthalate, polyethylene 1,5-naphthalate, polytetramethylene 1,2-dihydroxybenzoate, polyethylene terephthalate, polybutylene terephthalate and copolyesters, especially of ethylene terephthalate.

With polyesters the inner hoop draw ratio achieved is preferably at least two and preferably at least 3. At the same time the preferred axial draw ratio is at least two and preferably at least three. The processing temperature is preferably from 55 to 110° C. or even 55 to 120° C.

The processes of the present invention find particular application in the production of tubular materials comprising polyesters wherein the thickness of the wall of the product tube is from 0.2 to 0.6 mm. Such tubes are preferably produced from tubular billets utilising a deformation ratio of from 2 to 4.

For homo- or copolyoxymethylene a draw temperature of 80° C. to 170° C., preferably 150° C. to 170° C. is suitable and for vinylidene fluoride polymers a draw temperature of from 80° C. to 165° C. is suitable For vinyl chloride polymers especially polyvinyl chloride itself the preferred axial and hoop draw ratios are at least 1.2 preferably at least 1.5 or 2.0. Values of not greater than three may also be preferred. The ratio of the axial draw ratio to the inner hoop draw ratio may be less than unity and is preferably in the range 0.5 to 1.0.

The processing temperature may be further controlled by utilising a heated former and/or a temperature controlled chamber which extends downstream. Certain polymers may also be heated by subjecting them to a dielectric field, as disclosed in EPC 0084274 and US 3364294.

It is feasible to use draw speeds greater than 200 cm min$^{-1}$ in the drawing process of this invention. Speeds of 50 cm min$^{-1}$ or more are preferred. Lower draw speeds may be used if desired.

The process may be operated by drawing the workpiece directly over the surface of the former. However, it may be preferred to lubricate the surface of the former with a non-liquid lubricant as this can improve the quality of the interior surface of the workpiece and also serve to reduce the force required to draw the workpiece. Conveniently the surface is lubricated by use of air (which is preferably heated to an appropriate temperature). These advantages may also be achieved by varying the nature of the former, e.g. by utilising a former whose surface is formed by a multiplicity of small rollers or spherical elements, The improved surface properties are of particular relevance to processes which utilise workpieces formed from transparent polymers. The processes of the present invention find particular application to the production of transparent products since the exterior surface of the workpiece need not come into contact with the interior surface of a die as is the case in the process of our UK Patent 2156733. Processes for the production of transparent workpieces in which the exterior surface of the hollow workpiece does not contact another solid surface form a preferred aspect of the present invention. The use of a lubricated surface on the former represents a preferred aspect of this embodiment.

In some circumstances it may be preferable to employ a die having an internal diameter equal to the external diameter of the workpiece to act as a guide member to support the workpiece prior to its being drawn over the former. Contact with the surface of such a guide may detract from the surface properties of a transparent workpiece and is thereby less preferred. However, when utilising opaque workpieces or transparent workpieces intended for use in non-decorative applications, the use of such a guide may well be convenient.

In performance of the invention a nose formed on the hollow workpiece is advanced to protrude beyond the former and is secured to tensioning means applied from the exit side thereof. A suitable arrangement includes a hauloff comprising a pair of serrated jaws in which the nose is gripped; a high tensile cable one end of which cable is attached to the jaws, the other to a winch or a loading station to which a turning moment or mass may be applied thereby applying a draw tension to the nose. The hauloff may also comprise, instead of a cable, any tension transmitting means used in the metal drawing art including a chain, a rack and pinion mechanism, a screw mechanism and a hydraulically operated draw mechanism. The hauloff may further comprise a pair of continuous contra-rotating friction belts, generally known as a "caterpillar" ("CATERPILLAR" is a registered Trademark).

The draw tension should be sufficient to draw the hollow workpiece over the former but insufficient to cause tensile failure of the article; that is, the draw tension should be such that the true stress at any point of the product does not exceed its fracture stress at that point. A suitable maximum value of draw tension may readily be determined by routine experiment.

In the drawing the apparatus consists of a former 1 and upstream thereof an oven 2. The former 1 is supported by rod 3. Hauloff jaws 4 are positioned downstream from the former 1 and are connected to the winch (not shown). The former has an annular slit 6 connected to pipe 7.

In use the initial hollow workpiece 5 which has been machined at one end to provide a nose is inserted over the former 1 and rod 3. The nose is gripped in the jaws 4 and load applied slowly at first so that the plastic strain is increased without causing tensile failure. After this start-up a steady drawing speed at a steady drawing load is established.

EXAMPLES

The invention is illustrated by the following Examples:

Example 1

The workpiece comprised a tube of isotropic polypropylene (ICI grade GSE 108) having an internal diameter of 18.5 mm and an external diameter of 26.5 mm.

As a preliminary operation a belled end was formed on one end of the tube by heating that end to a temperature of 140° C. and inserting a hot metal plug in the shape of a taper nosed cylinder into the bore of the tube. The end of the tube and the plug were immersed in hot oil until the end had deformed sufficiently.

The tube was then mounted in the apparatus illustrated in FIG. 1. The tube was drawn over a former having a maximum diameter of 70 mm and a cartridge heater through which additional heat could be applied. The tube was drawn at a speed of 13 cm min$^{-1}$ at a draw temperature of 135° C. and using a draw force of 1.55 kN.

The drawn tube was substantially uniform throughout its length having an exterior diameter of 62 mm and a wall thickness of 0.225 mm. The hoop draw ratio of the outer surface was 2.25. The axial draw ratio was 6.5.

The 10 sec creep modulus at 0.1% strain of samples cut from the drawn tube was determined for the axial and hoop direction using the standard dead loading creep method described by Gupta and Ward (V. B. Gupta and I. M. Ward—J. Macromol. Sci. 81 373 1967). The 10 sec creep modulus in the axial direction was 3.7 GPa and in the hoop direction 1.7 GPa.

Example 2

A tubular billet having an external diameter of 25 mm and an internal diameter of 17 mm of a clear amorphous copolyester (Eastmann 9921) was first deformed so as to provide a belled nose. The tube was placed in an oven at a temperature of 110° C. in such a way that a zone of a length of approximately 15 centimeters was heated. After 5 minutes the tube was removed and quickly inflated with room temperature compressed air to a pressure of 620 KN/m$^2$ whereupon a bubble is blown in the heated part. After depressurising and cooling one end of the bubble is removed so as to produce a belled end on the tube.

The tube was then mounted in the apparatus illustrated in FIG. 1 Air heated to a temperature of 95° C. was passed through the slit 6 via the pipe 7 So as to float the tube above the surface of the former. The air pressure used was 275 KN/m$^2$ and the air flow was 40 cubic feet per hour.

The oven was maintained at a temperature of 90° C. throughout the drawing process. The tube was drawn at a speed of 20 cm/min using a draw force of 1.5 KN.

The drawn tube was transparent and had an exterior diameter of 76 mm. The wall thickness was 0.31 mm. The axial draw ratio was 3.5. The hoop draw ratio of the outer surface was 3.0.

The Youngs modulus of samples of the drawn tube having a width of 9.8 mm and a gauge length of 10.6 cms were determined in an Instron tensile testing machine at a strain rate of $3.3 \times 10^{-4}$ sec$^{-1}$.

The stress strain curve was linear up to at least 0.5% strain. The initial modulus for the axial and hoop directions are shown in Table 1.

TABLE 1

| Direction | Initial Modulus (GPa) | Extension to Break (%) |
|---|---|---|
| Axial | 3.1 | 63 |
| Hoop | 3.0 | 66 |

Example 3

A series of billets were formed and drawn using the apparatus as shown in FIG. 1. The conditions employed and the results achieved are summarised in Table 2. For ease of comparison the details of Examples 1 and 2 are included in this table.

TABLE 2

Examples of Die free drawing

| Material | Billet size ID (mm) | Billet size OD (mm) | Mandrel size (mm) | Draw Temp. (°C.) | Draw Speed (cm/min) | Draw Force (KN) | Axial draw ratio | Inner surface Hoop draw ratio | Outer surface Hoop draw ratio | |
|---|---|---|---|---|---|---|---|---|---|---|
| Polypropylene *GSE 108 | 18.5 | 26.5 | 70.0 | 135 | 13.0 | 1.55 | 6.5 | 3.33 | 2.25 | Ex 1 |
| | " | " | " | 155 | 6.5 | 1.10 | 6.15 | 3.61 | 2.5 | |
| | " | " | " | " | 65.0 | 1.10 | 8.60 | 2.65 | 1.85 | |
| PET (Eastman 9221) | 17.0 | 25.0 | 80.0 | 90 | 20.0 | 1.5 | 3.5 | 4.4 | 3.0 | Ex 2 |
| HDPE 00-240 | 21.0 | 62.0 | 62.0 | 115 | 3.0 | 8.0 | 3.8 | 2.7 | 1.03 | |
| | " | " | " | " | 50.0 | 8.0 | 5.9 | 2.6 | 0.97 | |
| PVC (BS 3505 CL7) | 32.0 | 42.0 | 70.0 | 100 | 2.0 | 2.65 | 1.47 | 1.90 | 1.55 | |
| | " | " | " | " | 12.0 | 2.65 | 1.55 | 1.80 | 1.47 | |

What we claim is:

1. A biaxially oriented open-ended polyolefin tube of wall thickness 0.1 mm or greater having uniform cross-section wherein the 10 sec creep modulus at 0.1% strain measured using standard dead loading creep method is at least 3.7 GPa in the axial direction and is at least 1.7 GPa in the hoop direction.

2. A tube as claimed in claim 1, wherein the tube is of isotropic polypropylene.

3. A tube as claimed in claim 1, wherein the tube wall is of thickness of 0.1 to 5.0 mm.

4. A tube as claimed in claim 1, wherein the tube wall is of thickness about 0.225 mm.

5. A tube as claimed in claim 1, wherein the tube wall is of thickness of 0.225 to 5.0 mm.

6. A biaxially oriented open-ended polyolefin tube of wall thickness 0.225 mm or greater having uniform cross-section wherein the 10 sec creep modulus at 0.1% strain measured using standard dead loading creep method is at least 3.7 GPa in the axial direction and is at least 1.7 GPa in the hoop direction.

7. A tube as claimed in claim 6 wherein the tube is of isotropic polypropylene.

* * * * *